(12) United States Patent
Black et al.

(10) Patent No.: US 8,665,525 B2
(45) Date of Patent: Mar. 4, 2014

(54) SHAPED GRADIENT LENS

(71) Applicant: EMS Technologies, Inc., Norcross, GA (US)

(72) Inventors: Donald N. Black, Cumming, GA (US);
Enrique Jesus Ruiz, Duluth, GA (US);
William M. Smith, Duluth, GA (US);
John Haslam, Woodstock, GA (US);
John L. Beafore, Duluth, GA (US)

(73) Assignee: EMS Technologies, Inc., Norcross, GA (US)

( * ) Notice: Subject to any disclaimer, the term of this patent is extended or adjusted under 35 U.S.C. 154(b) by 0 days.

(21) Appl. No.: 13/709,238

(22) Filed: Dec. 10, 2012

(65) Prior Publication Data
US 2013/0100536 A1   Apr. 25, 2013

Related U.S. Application Data

(62) Division of application No. 12/699,214, filed on Feb. 3, 2010, now Pat. No. 8,351,127.

(60) Provisional application No. 61/150,651, filed on Feb. 6, 2009.

(51) Int. Cl.
*G02B 9/00* (2006.01)
*G02B 27/30* (2006.01)

(52) U.S. Cl.
USPC ............ 359/652; 359/641; 359/664; 359/741

(58) Field of Classification Search
USPC .......................................... 359/652–655, 664
See application file for complete search history.

(56) References Cited

U.S. PATENT DOCUMENTS

| 2,866,971 A | 12/1958 | Kelleher |
| 2,968,228 A * | 1/1961 | Merritt ............................ 396/50 |
| 4,268,112 A * | 5/1981 | Peterson ........................... 385/61 |
| 4,422,733 A * | 12/1983 | Kikuchi et al. ............... 359/652 |
| 4,889,409 A | 12/1989 | Atcheson |
| 2006/0109561 A1 | 5/2006 | Handerek et al. |
| 2010/0060521 A1 | 3/2010 | Hayes et al. |

OTHER PUBLICATIONS

Gordon, "Spherical gradient-index lenses as perfect imaging and maximum power transfer devices", Aug. 1, 2000, pp. 3825-3832, vol. 39, No. 22, Publisher: Applied Optics.

* cited by examiner

*Primary Examiner* — Jordan Schwartz
(74) *Attorney, Agent, or Firm* — Fogg & Powers LLC

(57) ABSTRACT

One embodiment provides for a gradient lens having a first substantially hemispherical member comprising a first convex surface and a base and a second substantially hemispherical member projecting away from the base of the first hemispherical member and comprising a second convex surface. The gradient lens also includes a plurality of gradient layers disposed within the first hemispherical member, each gradient layer concentrically aligned to the first hemispherical member and comprising an index of refraction different than that of adjacent gradient layers.

7 Claims, 4 Drawing Sheets

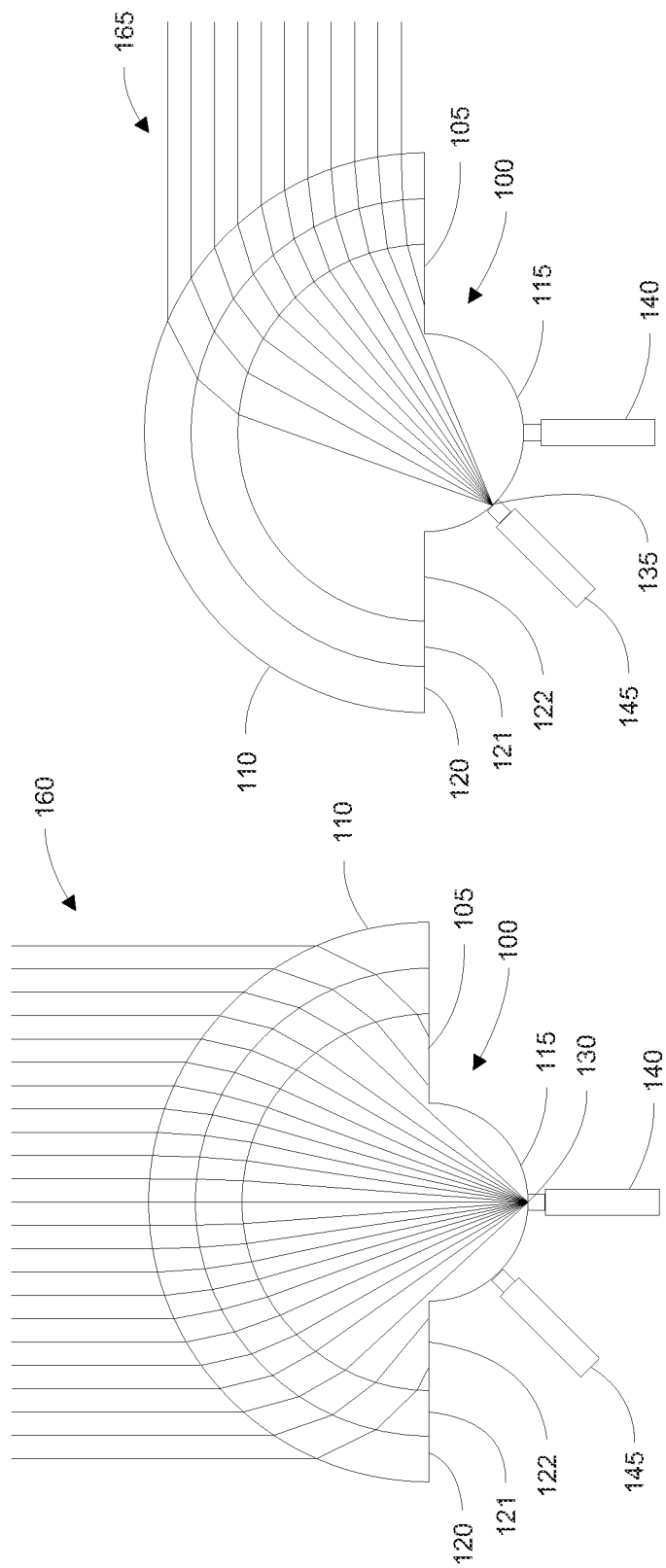

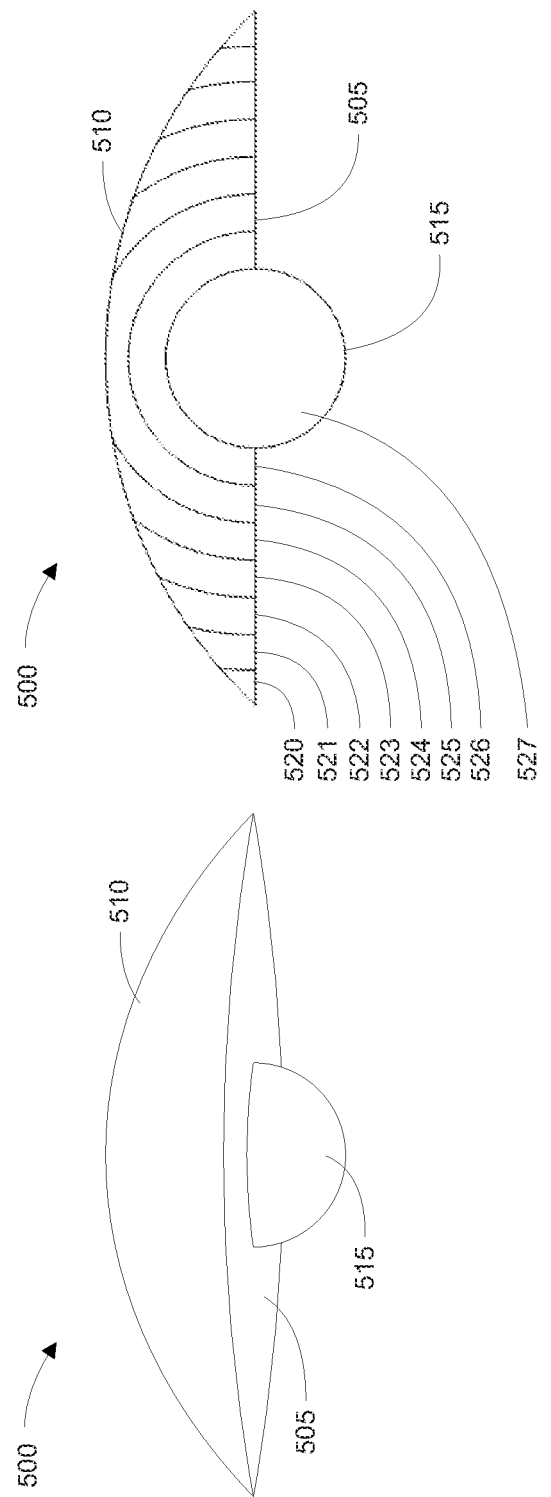

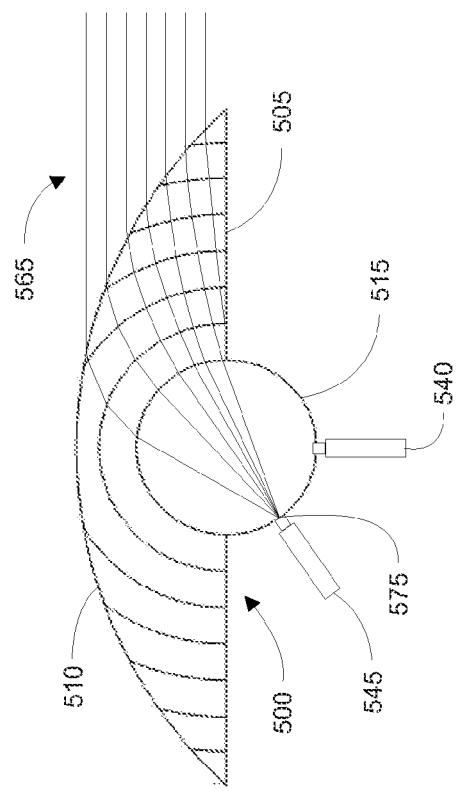
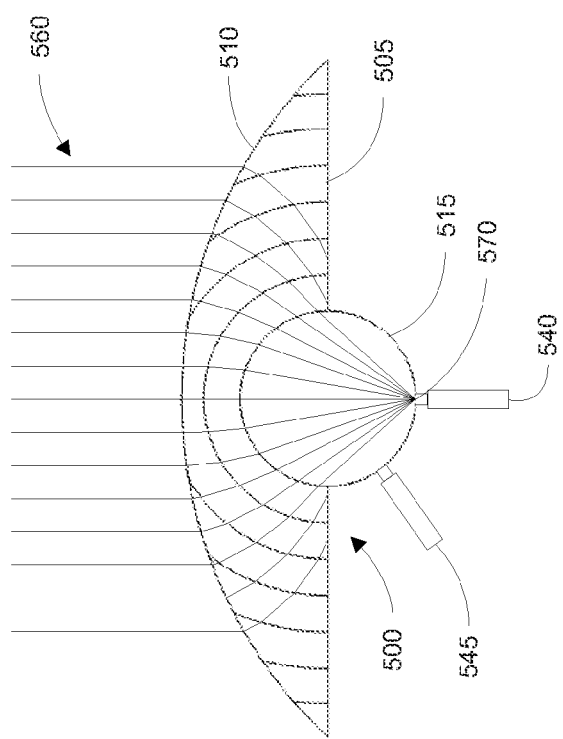
Fig. 7
Fig. 8

SHAPED GRADIENT LENS

RELATED PATENT APPLICATIONS

This patent application claims priority under 35 U.S.C. §120 to U.S. patent application Ser. No. 12/699,214, entitled "Shaped Gradient Lens," filed Feb. 3, 2010, which claims the benefit of Provisional Patent Application No. 61/150,651, entitled "Shaped Gradient Lens," filed Feb. 6, 2009, and is related to U.S. patent application Ser. No. 12/322,592, entitled "Modal Beam Positioning," filed on Feb. 4, 2009. The entire contents of each of the foregoing priority and related applications are hereby fully incorporated herein by reference.

TECHNICAL FIELD

The invention relates generally to lenses for use in antenna communications and more particularly to shaped gradient lenses for focusing parallel rays of electromagnetic energy received at one surface of a lens to a focal point on a second surface of the lens for receipt by an antenna feed element.

BACKGROUND

Lenses alter the direction of travel of transmitted electromagnetic waves. Lenses are often used to focus or defocus beams or parallel rays of electromagnetic energy incident on a surface of the lens. Some everyday devices that use lenses include corrective eyeglasses, cameras, and binoculars. In these applications, the lenses focus electromagnetic energy radiating at optical frequencies. Lenses are also commonly used for high frequency electromagnetic radiation, such as microwave frequencies and frequencies extending into the gigahertz range.

One type of lens is a gradient lens. Typically, a gradient lens is a device for which the dielectric constant of the material from which the lens is constructed, and thus the index of refraction, varies along a path of a ray representing energy direction of propagation passes through the lens. As the ray passes from a first medium having a first index of refraction into a second medium having a different index of refraction at a direction that is not perpendicular to the boundary between the two mediums, the direction of the ray is changed. If the first medium has a smaller index of refraction than that of the second medium, the ray bends toward a normal perpendicular to the boundary as the ray passes into the second medium. That is, the ray in the second medium is propagating in a direction closer to the normal.

Most lenses focus incoming light to a focal point that is substantially removed from the lens. However, in many applications, it would be useful for the focal point(s) of a lens to be on a surface of the lens. Lenses with focal points on the surface of the lens include Luneburg lenses, Maxwell fisheye lenses and constant-K lenses. These lenses tend to be spheres which can be large and heavy as aperture size increases. Accordingly, a need in the art exists for a lens that can focus parallel rays of electromagnetic energy received at one surface of a lens onto a focal point at a second surface of the lens where the lens is smaller than a full sphere.

SUMMARY

The present invention provides a gradient lens capable of focusing electromagnetic rays received at a first lens surface onto a second lens surface. The first lens surface and second lens surface can include convex surfaces protruding in opposite directions from a substantially planar surface. The lens can include a gradient index between the first surface and the planar surface and a gradient index between the two convex surfaces. The lens can include two or more gradient layers, each gradient layer having an index of refraction different than that of adjacent gradient layers. The gradient layers can focus parallel rays of energy incident on the first surface onto a focal point at the second surface of the lens. As the parallel rays pass from one gradient layer to the next, the rays are redirected toward the focal point.

One aspect of the present invention provides a gradient lens. This gradient lens can include a substantially planar surface, a first convex surface opposite from and projecting outward from the substantially planar surface, a second convex surface opposite from and projecting away from the first convex surface and forming a protrusion with respect to the substantially planar surface, and a gradient index between the first convex surface and the substantially planar surface.

Another aspect of the present invention provides a gradient lens. This gradient lens can include a first substantially hemispherical member comprising a first convex surface and a base. The gradient lens also can include a second substantially hemispherical member projecting away from the base of the first hemispherical member and comprising a second convex surface. Gradient layers can be disposed within the first hemispherical member. Each gradient layer can be concentrically aligned to the first hemispherical member and include an index of refraction different than that of adjacent gradient layers.

Another aspect of the present invention provides a method for receiving parallel rays at a lens. A first surface of the lens can receive first substantially parallel rays incoming from a first direction. The first surface of the lens also can receive second substantially parallel rays incoming from a second direction that is substantially different than the first direction. The lens can focus the first substantially parallel rays onto a first focal point on a second surface of the lens and focus the second substantially parallel rays onto a second focal point on the second surface of the lens, the second focal point being different than the first focal point.

The discussion of gradient lenses presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

BRIEF DESCRIPTION OF THE DRAWINGS

For a more complete understanding of the invention and the advantages thereof, reference is now made to the following description, in conjunction with the accompanying figures briefly described as follows.

FIG. 3 is a diagram showing the gradient lens of FIG. 1 focusing parallel rays of electromagnetic energy incident on a lens surface of the gradient lens from a direction substantially perpendicular to a planar surface of the gradient lens in accordance with certain exemplary embodiments.

FIG. 4 is a diagram showing the gradient lens of FIG. 1 focusing parallel rays of electromagnetic energy incident on a lens surface of the gradient lens from a direction substantially parallel to a planar surface of the gradient lens in accordance with certain exemplary embodiments.

FIG. 5 is a perspective view of a gradient lens in accordance with certain exemplary embodiments.

FIG. 6 is a cross sectional view of the gradient lens of FIG. 5 in accordance with certain exemplary embodiments.

FIG. 7 is a diagram showing the gradient lens of FIG. 5 focusing parallel rays of electromagnetic energy incident on a lens surface of the gradient lens from a direction substantially perpendicular to a planar surface of the gradient lens in accordance with certain exemplary embodiments.

FIG. 8 is a diagram showing the gradient lens of FIG. 5 focusing parallel rays of electromagnetic energy incident on a lens surface of the gradient lens from a direction substantially parallel to a planar surface of the gradient lens in accordance with certain exemplary embodiments.

DETAILED DESCRIPTION OF EXEMPLARY EMBODIMENTS

Certain exemplary embodiments provide a gradient lens capable of focusing electromagnetic rays received at a first lens surface onto a second lens surface. The first lens surface and second lens surface can include convex surfaces protruding in opposite directions from a substantially planar surface. The lens can include a gradient index between the first surface and the planar surface and a gradient index between the two convex surfaces. The lens can include two or more gradient layers, each gradient layer having an index of refraction different than that of adjacent gradient layers. The gradient layers can focus parallel rays of energy incident on the first surface onto a focal point at the second surface of the lens. As the parallel rays pass from one gradient layer to the next, the rays are redirected toward the focal point. One or more waveguides can be disposed along the second surface to receive the rays of energy and to transmit rays of energy through the lens.

Exemplary gradient lenses will now be described more fully hereinafter with reference to FIGS. 1-8, which illustrate representative embodiments of the present invention. The invention can be embodied in many different forms and should not be construed as limited to embodiments set forth herein; rather, these embodiments are provided so that this disclosure will be through and complete, and will fully convey the scope of the invention to those having ordinary skill in the art. Furthermore, all "example" or "exemplary embodiments" given herein are intended to be non-limiting, and among others supported by representations of the present invention.

Figure 2:
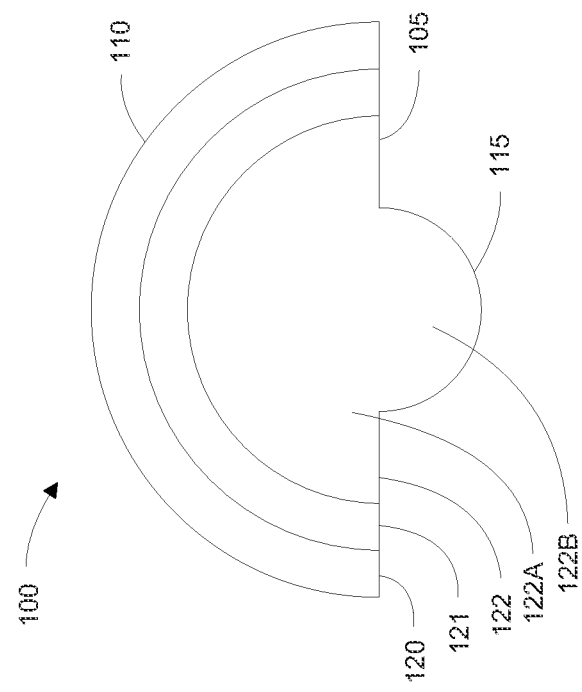
FIG. 2 is a cross sectional view of the gradient lens of FIG. 1 in accordance with certain exemplary embodiments.
Figure 1:
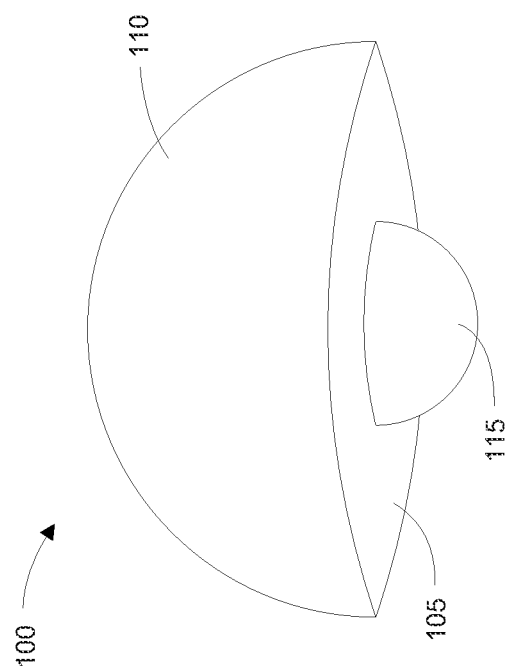
FIG. 1 is a perspective view of a gradient lens in accordance with certain exemplary embodiments.

Turning now to the drawings, in which like numerals indicate like elements throughout the figures, exemplary embodiments are described in detail. FIGS. 1 and 2 illustrate a gradient lens 100 in accordance with certain exemplary embodiments. In particular, FIG. 1 is a perspective view of a gradient lens 100 in accordance with certain exemplary embodiments, and FIG. 2 is a cross sectional view of the gradient lens 100 of FIG. 1 in accordance with certain exemplary embodiments.

Referring to FIGS. 1 and 2, the lens 100 includes a substantially planar surface 105 and two convex lens surfaces 110 and 115. In this exemplary embodiment, each lens surface 110 and 115 has a substantially hemispherical shape. In alternative exemplary embodiments, one or both lens surfaces 110 and 115 may have a semispherical shape comprising a portion of a sphere less than or greater than that of a hemisphere. In certain other exemplary embodiments, sides of the lens surface 110 adjacent to the planar surface 105 may be flat rather than round. In certain other exemplary embodiments, the lens surfaces 110 and 115 may be non-spherical or zoned. In certain exemplary embodiments, one or both lens surfaces 110 and 115 can be shaped to conform to the surface of an adjacent object, such as a radome, window, or aperture.

The lens surface 115 projects outward from the planar surface 105 while the lens surface 110 is opposite of and projects away from the planar surface 105. The two lens surfaces 110 and 115 can be centrally aligned with the planar surface 105. Although in this exemplary embodiment, the lens surface 115 is substantially smaller than lens surface 110, in alternative exemplary embodiments, the lens surfaces 110 and 115 may have more similar sizes or lens surface 115 may be larger than that of lens surface 110.

As depicted in FIG. 2, the lens 100 includes three gradient layers 120-122 disposed between the two lens surfaces 110 and 115. The gradient layers 120-122 are configured to redirect parallel rays of electromagnetic energy incident on the lens surface 110 toward a focal point on the lens surface 115. To accomplish this, the gradient layers 120-122 generally provide a gradient index between the lens surface 110 and 115. More particularly, the gradient layers 120-122 provide a step-wise increasing index of refraction from lens surface 110 to lens surface 115. In this configuration, gradient layers 120-122 closer to the surface 110 have a smaller index of refraction than gradient layers 120-122 closer to lens surface 115. In certain exemplary embodiments, each gradient layer 120-122 has a uniform index of refraction that is different than adjoining gradient layers 120-122.

In certain exemplary embodiments, the lens 100 may include a gradient implemented as a continuum of dielectric change. Such an implementation may be achieved through the use of conically tapered holes. These holes control an air-dielectric mix in the lens 100 material. Air has a dielectric constant of approximately one, and is generally lower than the dielectric used in the lens 100. In these implementations, the large radius end of the conical hole generates a lower dielectric constant than the small radius end of the conical hole because the large radius end introduces more air into the dielectric material, averaging down the net dielectric constant. An example of a lens having a gradient implemented as a continuum of dielectric change is described in U.S. Pat. No. 5,677,796, entitled "Luneberg Lens and Method of Constructing Same," filed on Aug. 25, 1995, the entire contents of which are hereby fully incorporated herein by reference.

As a ray passes from a medium having a lower index of refraction to a medium having a higher index of refraction at an angle that deviates from perpendicular to the boundary between the two mediums, the ray is bent toward a normal perpendicular to the boundary. For example, considering that the index of refraction of air is approximately one, if a ray propagating through air passes through the surface 110 into the gradient layer 120 having an index of refraction greater than one at an angle with respect to the point of the surface 110 that the ray passes through, the direction of the ray would be bent toward a normal perpendicular to a plane corresponding to that point on the surface 110.

The resultant direction of a ray that passes between mediums having differing indices of refraction is dependant on the angle of incidence of the ray with respect to the boundary's normal and the ratio of the indices of refraction of the two mediums. According to Snell's law, the angle of refraction (i.e., angle of ray in second medium with respect to the normal) is given by Equation 1 below.

$$\sin\theta_2 = \frac{n_1}{n_2}\sin\theta_1 \qquad \text{Equation 1}$$

In Equation 1, $n_1$ is the index of refraction of the medium from which the ray passes from and $\theta_1$ is the angle of incidence of the ray with respect to the boundary's normal. Likewise, $n_2$ is the index of refraction of the medium in which the ray passes to and $\theta_1$ is the angle of refraction of the ray resulting from passing between the two mediums. As can be deciphered from Equation 1, the angle of refraction is smaller for smaller ratios of $n_1$ to $n_2$. That is, a ray passing from a medium having index of refraction $n_1$ to a medium having index of refraction of $n_2$ will bend more toward the normal of the boundary with a larger $n_2$ with respect to $n_1$.

As briefly described above, the gradient layers 120-122 of the lens are configured to redirect parallel rays of electromagnetic energy incident on the lens surface 110 toward a focal point on the lens surface 115. In this exemplary embodiment, the lens 100 includes three gradient layers 120-122, each gradient layer having a different index of refraction than each other gradient layer. In order to redirect rays incident on the surface 110 toward a focal point on the lens surface 115, the index of refraction of gradient layer 122 is greater than that of gradient layer 121 and the index of refraction of gradient layer 121 is greater than that of gradient layer 120. For example, the index of refraction of gradient layer 120 may be 2.54, the index of refraction of gradient layer 121 may be 4, and the index of refraction of gradient layer 122 may be 9.

The gradient layer 122, which is bounded by lens surface 115, planar surface 105, and gradient layer 121, comprises two solid hemispherical regions 122A and 122B joined at their respective bases. Although in this exemplary embodiment, region 122A is substantially larger than that of region 122B, in alternative exemplary embodiments, the regions 122A and 122B can have substantially similar sizes. That is, the gradient layer 122 can have a substantially spherical shape in alternative exemplary embodiments. The gradient layers 120 and 121 are hemispherical shaped "shells" disposed concentrically between the gradient layer 122 and lens surface 110. Although there are two hemispherical shell-like gradient layers 120 and 121 in this exemplary embodiment, any number of shells may be used to provide a desired gradient index between the lens surface 110 and the lens surface 115. Additionally, although not illustrated in FIG. 1, gradient layers in the form of hemispherical shells can also be disposed over region 122B.

Each of the gradient layers 120-122 can comprise a solid dielectric having a substantially uniform index of refraction throughout the gradient layer 120-122. Some exemplary materials that can be used for the gradient layers include TPX, REXOLITE, polytetrafluoroethylene ("TPFE"), polystyrene, and additives in a base material, such as polystyrene. Each of the gradient layers 120-122 can comprise substantially similar materials having different indices of refraction or different materials. For example, the gradient layers 120 and 121 may comprise REXOLITE, while the gradient layer 122 comprises polystyrene. Alternatively, or additionally, materials having a varying index of refraction can be used. For example, one or more of the gradient layers 120-122 can comprise a Luneberg lens. Tapered holes in a material having a large dielectric constant can achieve this effect as described in U.S. Pat. No. 5,677,796.

The lens 100 can be manufactured in various ways. For example, the gradient layer 122 can be manufactured by first constructing a spherical lens corresponding to a sphere having two hemispheres the size of region 122A. Then, a portion of one hemisphere of the spherical lens can be trimmed to form the region 122B of the gradient layer 122. Next, a hemispherical shell can be glued or otherwise attached to the gradient layer 122 over the region 121 to form the gradient layer 121. Finally, a second hemispherical shell can be glued or otherwise attached over gradient layer 121 to form gradient layer 120. In another example, each region 122A and 122B of gradient layer 122 can be manufactured separately and glued together to form the gradient layer 122. In certain exemplary embodiments, components having the same or similar indices of refraction are integral as gluing two components may introduce air between two separate components.

The use of tapered holes as discussed earlier is another approach to manufacturing the lens 100. The mixing in of air via the hole lowers the dielectric constant to the desired level. The slope of the hole controls the level through the depth of the hole to create the desired gradient. In this approach, the holes can be drilled or machined into a high dielectric material. The holes also can be part of an injection mold design. The holes also can be fabricated using a sintered laser stereographic ("SLS") technique.

FIGS. 3 and 4 are diagrammatical representations of the paths of two sets of parallel rays 160 and 165 of electromagnetic energy propagating through the lens 100 of FIG. 1. FIG. 3 is a diagram showing the gradient lens 100 focusing parallel rays 160 of electromagnetic energy incident on the lens surface 110 of the gradient lens 100 from a direction substantially perpendicular to the planar surface 105 of the gradient lens 100 in accordance with certain exemplary embodiments. FIG. 4 is a diagram showing the gradient lens 100 focusing parallel rays 165 of electromagnetic energy incident on the lens surface 110 of the gradient lens 100 from a direction substantially parallel to the planar surface 105 of the gradient lens 100 in accordance with certain exemplary embodiments. These diagrams illustrate how parallel rays incident from different directions can be focused onto different focal points on the surface 115 of the gradient lens 100.

Referring to FIG. 3, a plurality of parallel electromagnetic rays 160 are incident on the surface 110 of the gradient lens 100 in a direction substantially perpendicular to the planar surface 105. For the purposes of this explanation, the ambient medium may have an index of refraction of one and the indices of refraction of the gradient layers 120-122 have step-wise increasing indices of refraction from the gradient layer 120 to the gradient layer 122, each gradient layer 120-122 having an index of refraction greater than one. That is, the index of refraction of gradient layer 122 is greater than that of gradient layer 121, the index of refraction of gradient layer 121 is greater than that of gradient layer 120, and the index of refraction of gradient layer 120 is greater than that of the medium from which the rays 160 are propagating from.

As the rays 160 pass through the surface 110 into the gradient layer 120, each of the rays that deviates from perpendicular to the surface 110 where the ray passes through bends inward toward a normal perpendicular to a plane corresponding to the surface 110 where the ray passes through. Outermost rays with respect to the center of the planar surface 105 tend to bend more as the angle of incidence of the outermost rays is greater than the angle of incidence of the innermost rays.

Because the gradient layer 120 comprises a substantially uniform index of refraction, after the rays 160 bend passing through the lens surface 110, the rays 160 can continue on a substantially straight path until reaching a boundary between gradient layers 120 and 121. As the index of refraction of gradient layer 121 is greater than that of gradient layer 120, the rays 160 that deviate from perpendicular to the boundary where the ray passes is bent toward a normal perpendicular to a plane corresponding to the boundary where the ray passes through. Likewise, as the rays 160 pass from gradient layer 121 to gradient layer 122, the rays 160 are further bent toward a normal corresponding to a boundary between the gradient layers 121 and 122. The rays 160 then continue along this path until reaching a focal point 130 on the lens surface 115.

Referring now to FIG. 4, a plurality of parallel electromagnetic rays 165 are incident on the surface 110 of the gradient lens 100 in a direction substantially parallel to the planar surface 105. Similar to the rays 160, the rays 165 that deviate from perpendicular to the surface 110 where the ray passes through bends inward toward a normal perpendicular to a plane corresponding to the surface 110 where the ray passes through. As the rays 165 pass through each boundary between the gradient layers 120-122, the rays 165 are further bent toward a focal point 135 on the surface 115 of the lens 100.

The lens 100 can be used in many different applications, including those that would benefit from parallel rays being focused onto a focal point of a lens surface. For example, the lens 100 is particularly useful in antenna communications. Referring to FIGS. 3 and 4, antenna feed elements 140 and 145 can be disposed on the lens surface 115 to receive the rays 160 and 165, respectively. In particular, antenna feed element 140 is disposed on the lens surface 115 at the focal point 130 to receive the rays 160. Similarly, antenna feed element 145 is disposed on the lens surface 115 at the focal point 135 for receiving the rays 165. The location of the antenna feed element 145 to receive the rays 165 may be determined based upon the gradient design for the lens 100. In order to receive (and transmit) rays in substantially all directions via the lens 110, antenna feed elements can be disposed in three dimensions around the convex shaped lens surface 115. Additionally, the lens 100 can be used in an antenna system such as the multi-beam antenna system described in U.S. patent application Ser. No. 12/322,592, entitled "Modal Beam Positioning," filed on Feb. 4, 2009, the entire contents of which are hereby fully incorporated herein by reference. In such an embodiment, a network of antenna feed elements can be disposed around the lens surface 115.

FIGS. 5 and 6 illustrate a gradient lens 500 in accordance with certain exemplary embodiments. FIG. 5 is a perspective view of a gradient lens 500 in accordance with certain exemplary embodiments. FIG. 6 is a cross sectional view of the gradient lens 500 of FIG. 5 in accordance with certain exemplary embodiments. The gradient lens 500 is an alternative embodiment to that of gradient lens 100 of FIGS. 1-4. The gradient lens 500 includes features to support a low profile installation that can conform to the shape of a radome, window, or aperture in which the gradient lens 500 is installed. In certain exemplary embodiments, the outer layers of the gradient may be designed to function as a radome.

Referring to FIGS. 5 and 6, the gradient lens 500 includes a substantially planar surface 505 and two convex lens surfaces 510 and 515. In this exemplary embodiment, the lens surface 515 has a substantially hemispherical shape while the lens surface 510 has a semispherical shape comprising a portion of a sphere less than that of a hemisphere. The lens surface 515 projects outward from the planar surface 505 while the lens surface 510 is opposite of the planar surface 505 and projects away from the planar surface 505. The two lens surfaces 510 and 515 can be centrally aligned with the planar surface 505. In certain exemplary embodiments, the lens surfaces 510 and 515 may be non-spherical shaped or zoned. In certain exemplary embodiments, one or both lens surfaces 510 and 515 can be shaped to conform to the surface of an adjacent object, such as a radome or window, or to an aperture.

As depicted in FIG. 6, the lens 500 includes eight gradient layers 520-527 disposed between the lens surface 510 and the planar surface 505. Similar to the gradient lens 100 of FIG. 1, the gradient lens 500 is configured to redirect parallel rays of electromagnetic energy incident on the lens surface 510 toward a focal point on the lens surface 515. The gradient layers 520-527 likewise provide a gradient index between the lens surfaces 510 and 515 in the form of a step-wise increasing index of refraction from lens surface 510 to lens surface 515. That is, the index of refraction of gradient layers 520-526 disposed further from gradient layer 527 have smaller indices of refraction that gradient layers 520-526 disposed closer to gradient layer 527. Each of the gradient layers 520-527 can comprise a solid dielectric having a substantially uniform index of refraction throughout the gradient layer 520-527. Alternatively, or additionally, material having a varying index of refraction can be used in the gradient layers 520-527 of the gradient lens 500. The same or similar dielectric materials as those used to form the gradient layers 120-122 of gradient lens 100 also can be used to form the gradient layers 520-527 of gradient lens 500. In certain exemplary embodiments, the lens 500 may include a gradient implemented as a continuum of dielectric change as described above with reference to FIG. 2. In certain exemplary embodiments, sides of the lens surface 510 adjacent to the planar surface 505 may be flat rather than round.

The gradient lens 500 differs from that of the gradient lens 100 of FIGS. 1-4 in the shape and configuration of the gradient layers. In the gradient lens 100, each of the gradient layers 120 and 121 that were arranged as shells around the gradient layer 122 have a substantially hemispherical shape. The gradient lens 500 includes a substantially spherical gradient layer 527 and semispherical gradient layers 520-526 arranged as shells around the substantially spherical gradient layer 527. Instead of each shell-like gradient layer 520-526 having a hemispherical shape, only the gradient layer 526 disposed directly over the substantially spherical gradient layer 527 has a hemispherical shape. Each other shell-like gradient layer 520-525 comprises only a portion of a hemispherical shape. These shapes can be limited by the lens surface 510. Although in this exemplary embodiment, the lens 500 includes one hemispherical shaped gradient layer 526 and multiple semispherical gradient layers 520-525, the lens 500 can include any number of hemispherical gradient layers and any number of semispherical gradient layers.

The lens 500 can support a lower profile design than that of lens 100. That is the lens 500 can have a smaller height (measured from a peak on lens surface 510 to a peak on lens surface 515) to width (diameter of planar surface 505) ratio than that of lens 100. To support this lower profile design, the gradient layers 520-527 can have a more rapidly increasing gradient index from lens surface 510 to lens surface 515. Thus, the gradient layers 520-527 may bend rays of electromagnetic energy incident on the lens surface 510 more rapidly toward a focal point at the lens surface 515.

The lens 500 can be manufactured in various ways. For example, hemispherical shaped gradient layer 526 can be glued or otherwise attached to one half of substantially spherical shaped gradient layer 527. A hemispherical shell corresponding to each other gradient layer 520-525 can be attached, one at a time, over the gradient layer 527. After all of the gradient layers 520-527 are attached, the upper portion of the lens 510 can be trimmed to form the lens surface 510. Alternatively, each gradient layer 520-527 can be manufactured independently into its final form and attached to create the lens 510. Additionally, the lens 500 may be manufactured with tapered holes as described above with reference to FIG. 2.

FIGS. 7 and 8 are diagrammatical representations of the paths of two sets of parallel rays 560 and 565 of electromagnetic energy propagating through the lens 500 of FIG. 5. FIG. 7 is a diagram showing the gradient lens 500 focusing parallel rays 560 of electromagnetic energy incident on the lens surface 510 of the gradient lens 500 from a direction substantially perpendicular to the planar surface 505 of the gradient lens 500 in accordance with certain exemplary embodiments. FIG. 8 is a diagram showing the gradient lens 500 focusing parallel rays 565 of electromagnetic energy incident on the lens surface 510 of the gradient lens 500 from a direction substantially parallel to the planar surface 505 of the gradient lens 500 in accordance with certain exemplary embodiments. These diagrams illustrate how parallel rays incident from different directions can be focused onto different focal points on the surface of the lens 510.

Referring to FIG. 7, a plurality of parallel electromagnetic rays 560 are incident on the surface 510 of the gradient lens 500 in a direction substantially perpendicular to the planar surface 505. For the purposes of this explanation, the ambient medium may have an index of refraction of one and the indices of refraction of the gradient layers 520-527 have step-wise increasing indices of refraction from the gradient layer 520 to gradient layer 527, each gradient layer 520-527 having an index of refraction greater than one.

As the rays 560 pass through the surface 510 into the gradient layer 520, each of the rays that deviates from perpendicular to the surface 510 where the ray passes through bends inward toward a normal perpendicular to a plane corresponding to the surface 510 where the ray passes through. Outermost rays with respect to the center of the planar surface 505 tend to bend more as the angle of incidence of the outermost rays is greater than the angle of incidence of the innermost rays. As the rays 560 pass through each boundary between adjacent gradient layers 520-527, the rays 560 are further bent toward a focal point 570 on the surface 515 of the lens 500.

Referring now to FIG. 8, a plurality of parallel electromagnetic rays 565 are incident on the surface 510 of the gradient lens 500 in a direction substantially parallel to the planar surface 505. Similar to the rays 560, the rays 565 that deviate from perpendicular to the surface 510 where the ray passes through bends inward toward a normal perpendicular to a plane corresponding to the surface 510 where the ray passes through. As the rays 565 pass through each boundary between adjacent gradient layers 520-527, the rays 565 are further bent toward a focal point 575 on the surface 515 of the lens 500.

The lens 500 also can be used in antenna applications similar to that of lens 100. Referring to FIGS. 7 and 8, antenna feed elements 540 and 545 can be disposed on the lens surface 515 to receive the rays 560 and 565, respectively. In particular, antenna feed element 540 is disposed on the lens surface 515 at the focal point 570 to receive the rays 560. Similarly, antenna feed element 545 is disposed on the lens surface 515 at the focal point 575 for receiving the rays 565. In order to receive (and transmit) rays in substantially all directions via the lens 510, antenna feed elements can be disposed in three dimensions around the convex shaped lens surface 515. The location of the feed 545 to receive the rays 565 can be determined based upon the gradient design of the lens 500.

One of ordinary skill in the art would appreciate that the present invention supports a gradient lens capable of focusing electromagnetic rays received at a first lens surface onto a second lens surface. The first lens surface and second lens surface can include convex surfaces protruding in opposite directions from a substantially planar surface. The lens can include a gradient index between the first surface and the planar surface and a gradient index between the two convex surfaces. The lens can include two or more gradient layers, each gradient layer having an index of refraction different than that of adjacent gradient layers. The gradient layers can focus parallel electromagnetic rays incident on the first surface onto a focal point at the second surface of the lens. As the parallel electromagnetic rays pass from one gradient layer to the next, the rays are redirected toward the focal point.

Although specific embodiments have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A gradient lens comprising:
   a first member comprising a first semispherical refractive convex surface and a base;
   a second member projecting away from the base of the first member and comprising a second semispherical refractive convex surface, wherein a radius of the first convex surface is larger than a radius of the second convex surface; and
   a plurality of gradient layers disposed within the first member, each gradient layer comprising an index of refraction different than that of adjacent gradient layers and configured to focus parallel rays incident on the first convex surface onto a focal point on the second convex surface.

2. The gradient lens of claim 1, wherein the lens comprises a plurality of focal points on the second convex surface corresponding to a respective plurality of sets of parallel rays incident on the first convex surface, wherein the parallel rays of each set are angled with respect to the parallel ray of each other set.

3. The gradient lens of claim 1, wherein an index of refraction of each gradient layer increases layer by layer from the gradient layer proximal to the first convex surface to the gradient layer proximal to the second convex surface.

4. The gradient lens of claim 1, wherein each gradient layer comprises a portion of an annular shape substantially symmetrical about a point aligned with the base, and wherein each gradient layer is concentrically aligned to the first convex surface.

5. The gradient lens of claim 1, wherein each gradient layer comprises a portion of a spherical shape, the spherical shape of each portion having substantially the same center point.

6. The gradient lens of claim 1, wherein the first convex surface comprises a first center point and the second convex surface comprises a second center point, the first center point being offset from the second center point in the direction of the second convex surface.

7. The gradient lens of claim 1, further comprising a second gradient index between the second convex surface and the base of the first convex surface.

* * * * *